(No Model.)  B. S. McCLELLAN.  2 Sheets—Sheet 1.
HOSE HANGER.

No. 596,821.  Patented Jan. 4, 1898.

WITNESSES:  INVENTOR
B. S. McClellan
BY
ATTORNEYS

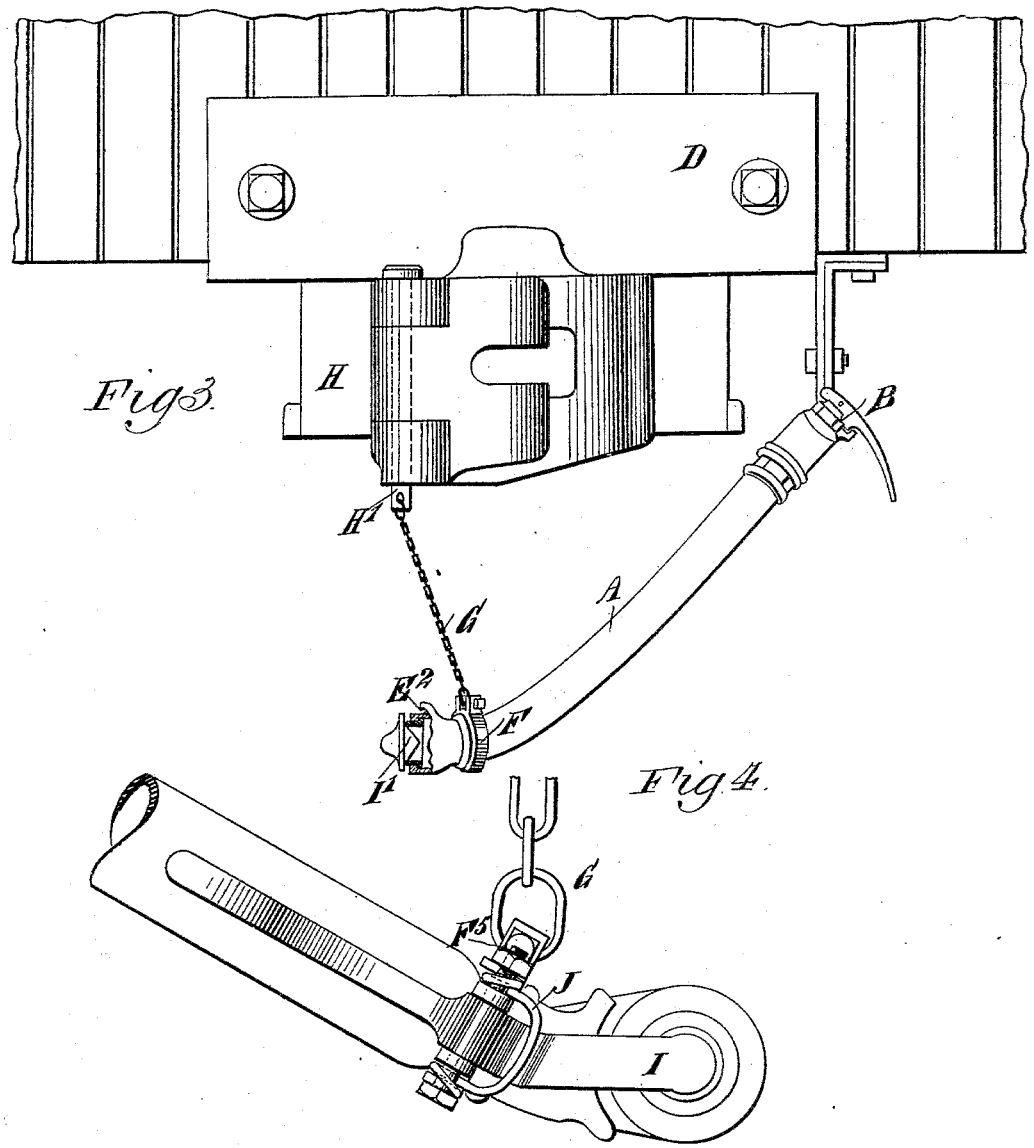

UNITED STATES PATENT OFFICE.

BENJAMIN SEWARD McCLELLAN, OF NEW ORLEANS, LOUISIANA.

HOSE-HANGER.

SPECIFICATION forming part of Letters Patent No. 596,821, dated January 4, 1898.

Application filed January 18, 1896. Serial No. 576,039. (No model.)

*To all whom it may concern:*

Be it known that I, BENJAMIN SEWARD MC-CLELLAN, of New Orleans, in the parish of Orleans and State of Louisiana, have invented certain new and useful Improvements in Hose-Hangers, of which the following is a full, clear, and exact description.

The invention relates to hose-hangers such as shown and described in the application for Letters Patent of the United States, Serial No. 555,280, filed by me on July 8, 1895.

The object of the present invention is to provide certain new and useful improvements in hose-hangers whereby the coupling end of the hose is held in proper position when not coupled to the companion member on the adjacent car, so as to prevent the hose from kinking and cracking, and at the same time sealing the opening in the coupling member to exclude dust and other foreign matter.

The invention consists principally of a flexible connection between the coupling end of the hose and the outer end of the car-coupling.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
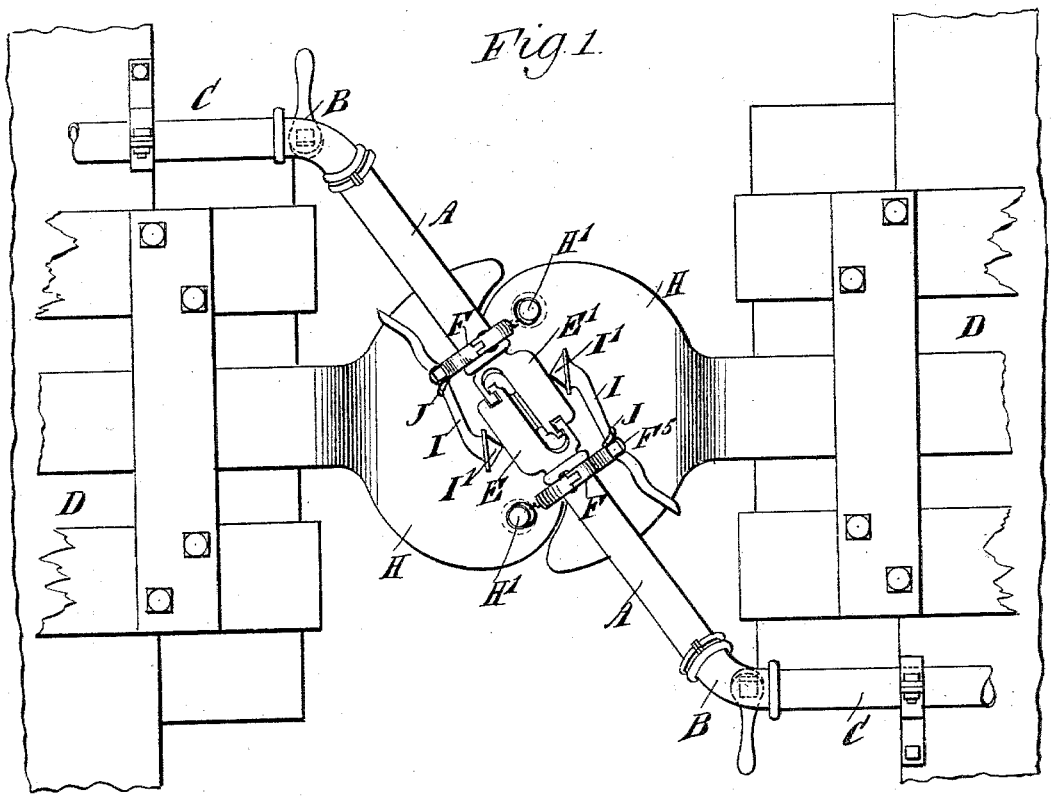
Figure 2:
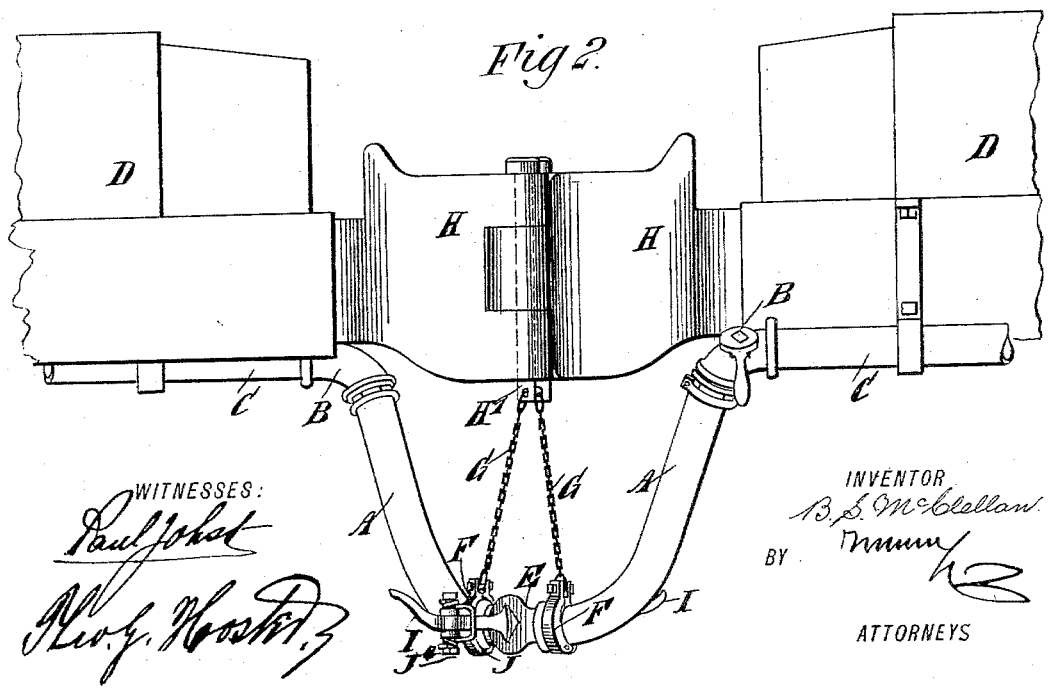

Figure 1 is an inverted plan view of the improvement as applied, showing the hose in a coupled position. Fig. 2 is a side elevation of the same. Fig. 3 is a front elevation of the same. Fig. 4 is an enlarged side elevation of the improvement, and Fig. 5 is an enlarged front elevation of the clamp.

The hose A is connected at its rear end with an angle-cock B on the brake-pipe C, secured to the under side of the car D in the usual manner. On the forward end of the hose A is held the usual coupling member E, adapted to engage the companion member E' on the hose A of the adjacent car, as plainly illustrated in Figs. 1 and 2.

On the hose A and next to the coupling member E or E' is secured a clamp F, engaged by the lower end of a chain G, extending upwardly in an inclined direction, so as to connect with the under side of a car-coupling H, preferably to the knuckle-pin H' if a knuckle-coupling is employed. The clamp F is preferably made of two parts F' and $F^2$, hinged together at $F^3$ and connected with each other at their free ends by a bolt $F^4$, adapted to be engaged with the lower link of the chain G, as shown in the drawings. On one side of the part $F^2$ of the clamp are formed bearings for a bolt $F^5$, which forms the pivot for a lever I, provided at its front end with a conically-shaped valve I', adapted to engage a gasket $E^2$, held in the open end of the member E at the time the latter is disengaged from the other member E'. (See Figs. 3 and 4.) A spring J, held on the bolt $F^5$, engages the forward end of the lever I, so as to securely hold the valve I' to its seat on the gasket $E^2$, it being understood that the said spring J will permit of pressing the lever I into an open position, as shown in Figs. 1 and 2, to let the valve I' rest on the outer face of the other coupling member E' or E. When the coupling members E and E' are disengaged, then the spring J acts on the lever I, so as to automatically force the valve I' to its seat on the gasket $E^2$.

It will be seen that by the arrangement described the flexible connection between the hose A and the car-coupling permits of conveniently connecting the two coupling members with each other or disengaging the same whenever desired, and when disengaged the flexible connection will hold the free end of the hose in a proper position, so as to prevent kinking of the hose and a consequent cracking thereof. It will further be seen that when the two members are disengaged the valve I' by automatically closing the coupling member prevents dust and other foreign matter from passing into the same.

Having thus fully described my invention, I claim as new and desire to secure by Letters Patent—

1. The combination with a car-coupling of the swinging-knuckle type and a hose-coupling for a flexible hose, of a clamping-ring adjacent to the hose-coupling, and a chain connected at one end to said clamping-ring and at the other end to the lower end of the knuckle-pin, the said chain being inclined upward and forward, whereby the hose-coupling will be held in a position to prevent kinking of the hose, substantially as described.

2. The combination with a hose and a coupling-head thereon, of a clamp consisting of two hinged parts, the free ends of the said sections having perforated spaced lugs to receive a clamping-bolt, a flexible hanger adapted for engagement with the clamping-bolt between the lugs, a bearing extended outward from one section of the clamp, a pivot-bolt engaging therewith, a lever fulcrumed on said bolt and carrying a valve for the coupling-head, and a spring held on the pivot-bolt and engaged with the lever, substantially as specified.

BENJAMIN SEWARD McCLELLAN.

Witnesses:
D. I. DOWERS,
STURGES S. ADAMS.